United States Patent
Graham et al.

(10) Patent No.: US 10,043,612 B2
(45) Date of Patent: Aug. 7, 2018

(54) METHODS FOR FORMING SHIELD MATERIALS ONTO INDUCTIVE COILS

(71) Applicant: Apple Inc., Cupertino, CA (US)

(72) Inventors: Christopher S. Graham, San Francisco, CA (US); Eric S. Jol, San Jose, CA (US); Makiko K. Brzezinski, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/269,925

(22) Filed: Sep. 19, 2016

(65) Prior Publication Data

US 2017/0011840 A1    Jan. 12, 2017

Related U.S. Application Data (63) Continuation of application No. 14/310,694, filed on Jun. 20, 2014, now Pat. No. 9,460,846.

(51) Int. Cl.
| | |
|---|---|
| *H02J 7/00* | (2006.01) |
| *H01F 27/28* | (2006.01) |
| *H01F 1/147* | (2006.01) |
| *H02J 50/70* | (2016.01) |
| *H01F 27/02* | (2006.01) |
| *H02J 7/02* | (2016.01) |

(Continued)

(52) U.S. Cl.
CPC ........... *H01F 27/288* (2013.01); *H01F 1/147* (2013.01); *H01F 27/02* (2013.01); *H01F 27/28* (2013.01); *H01F 27/365* (2013.01); *H01F 38/14* (2013.01); *H02J 7/0042* (2013.01); *H02J 7/0044* (2013.01); *H02J 7/025* (2013.01); *H02J 50/10* (2016.02); *H02J 50/70* (2016.02); *Y10T 29/49021* (2015.01)

(58) Field of Classification Search
CPC ........ H01F 27/288; H01F 27/28; H01F 27/02; H01F 1/147; H02J 7/025; H02J 7/0042; H02J 50/10; H02J 50/70
USPC .......................................... 320/108
See application file for complete search history.

(56) References Cited

U.S. PATENT DOCUMENTS

| | | | |
|---|---|---|---|
| 2,471,869 | A | 5/1949 | Gebel et al. |
| 3,676,814 | A | 7/1972 | Floyd et al. |

(Continued)

FOREIGN PATENT DOCUMENTS

| | | |
|---|---|---|
| CN | 102611215 | 7/2012 |
| CN | 102741954 | 10/2012 |

(Continued)

OTHER PUBLICATIONS

Flores et al., "Evaluation of Magnetic Behavior and in Vitro Biocpmpatibility of Ferritic PM2000 Alloy", May 2004, J Mater Sci Mater Med., abstract, one page.*

(Continued)

*Primary Examiner* — Sun Lin
(74) *Attorney, Agent, or Firm* — Kilpatrick Townsend & Stockton LLP (57) ABSTRACT

Methods of and systems for directing flux from a transmit coil to a receive coil within an inductive power transfer system are disclosed. For example, a transmit coil can be shielded with a contoured shield made from a ferromagnetic material. The contoured shield contours to several surfaces of the transmit coil so as to define a single plane through which magnetic flux is directed to a receive coil.

20 Claims, 6 Drawing Sheets

(51) Int. Cl.
*H02J 50/10* (2016.01)
*H01F 27/36* (2006.01)
*H01F 38/14* (2006.01)

(56) References Cited

U.S. PATENT DOCUMENTS

| | | | |
|---|---|---|---|
| 4,178,017 A * | 12/1979 | Ishi et al. | B60R 21/26 280/740 |
| 4,908,347 A | 3/1990 | Denk | |
| 5,708,362 A | 1/1998 | Frese et al. | |
| 5,872,500 A | 2/1999 | Gore | |
| 5,903,134 A | 5/1999 | Takeuchi et al. | |
| 5,979,087 A | 11/1999 | Bell et al. | |
| 6,667,435 B1 | 12/2003 | French et al. | |
| 7,477,039 B2 | 1/2009 | Rodarte | |
| 7,538,977 B2 | 5/2009 | Gider et al. | |
| 7,710,071 B2 | 5/2010 | Elizalde | |
| 7,948,208 B2 | 5/2011 | Partovi et al. | |
| 7,952,322 B2 | 5/2011 | Partovi et al. | |
| 8,169,185 B2 | 5/2012 | Partovi et al. | |
| 8,248,025 B2 | 8/2012 | Sip | |
| 8,497,657 B2 | 7/2013 | Franks et al. | |
| 8,629,652 B2 | 1/2014 | Partovi et al. | |
| 8,629,654 B2 | 1/2014 | Partovi et al. | |
| 8,704,628 B2 | 4/2014 | Kook et al. | |
| 8,823,238 B2 | 9/2014 | Greaves et al. | |
| 8,890,470 B2 | 11/2014 | Partovi | |
| 8,896,264 B2 | 11/2014 | Partovi | |
| 8,901,775 B2 * | 12/2014 | Armstrong et al. | H02J 7/025 307/104 |
| 8,901,881 B2 | 12/2014 | Partovi | |
| 8,922,162 B2 | 12/2014 | Park et al. | |
| 8,947,047 B2 | 2/2015 | Partovi et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,178,369 B2 | 11/2015 | Partovi | |
| 9,240,270 B2 | 1/2016 | Sealy et al. | |
| 9,460,846 B2 * | 10/2016 | Graham et al. | H01F 27/365 |
| 2011/0050164 A1 | 3/2011 | Partovi et al. | |
| 2011/0221385 A1 | 9/2011 | Partovi et al. | |
| 2013/0049484 A1 | 2/2013 | Weissentern et al. | |
| 2013/0093388 A1 | 4/2013 | Partovi et al. | |
| 2013/0099563 A1 | 4/2013 | Partovi et al. | |
| 2013/0249479 A1 | 9/2013 | Partovi et al. | |
| 2013/0260677 A1 | 10/2013 | Partovi et al. | |
| 2013/0271069 A1 | 10/2013 | Partovi et al. | |
| 2013/0285604 A1 | 10/2013 | Partovi et al. | |
| 2013/0285605 A1 | 10/2013 | Partovi et al. | |
| 2013/0300204 A1 | 11/2013 | Partovi et al. | |
| 2014/0103873 A1 | 4/2014 | Partovi et al. | |
| 2014/0132210 A1 | 5/2014 | Partovi et al. | |
| 2014/0191568 A1 | 7/2014 | Partovi et al. | |
| 2014/0306654 A1 | 10/2014 | Partovi et al. | |
| 2015/0130412 A1 | 5/2015 | Partovi | |
| 2015/0145475 A1 | 5/2015 | Partovi et al. | |
| 2015/0270058 A1 | 9/2015 | Golko et al. | |
| 2015/0371768 A1 | 12/2015 | Graham et al. | |
| 2016/0006288 A1 | 1/2016 | Wagman et al. | |
| 2016/0064141 A1 | 3/2016 | Graham et al. | |

FOREIGN PATENT DOCUMENTS

| | | |
|---|---|---|
| CN | 102952474 | 3/2013 |
| CN | 203381512 | 1/2014 |
| CN | 203434644 | 2/2014 |
| CN | 203466005 | 3/2014 |
| EP | 1511370 | 3/2007 |
| EP | 1790196 | 7/2012 |
| EP | 2535906 | 12/2012 |
| JP | 2012199370 | 10/2012 |
| JP | 2012222926 | 11/2012 |
| WO | 2003081976 | 10/2003 |
| WO | 2009105615 | 8/2009 |
| WO | 2012152980 | 11/2012 |
| WO | 2013035282 | 3/2013 |
| WO | 2014036558 | 3/2014 |

OTHER PUBLICATIONS

U.S. Appl. No. 14/310,694, "Ex Parte Quayle Action", Mar. 3, 2016, 6 pages.

U.S. Appl. No. 14/310,694, "Notice of Allowance", dated Jun. 6, 2016, 5 pages.

* cited by examiner

METHODS FOR FORMING SHIELD MATERIALS ONTO INDUCTIVE COILS

CROSS REFERENCES TO RELATED APPLICATION

This application is a continuation of U.S. patent application Ser. No. 14/310,694, filed on Jun. 20, 2014, the disclosure of which is herein incorporated by reference in its entirety for all purposes.

TECHNICAL FIELD

Embodiments described herein relate to electromagnetic power transfer systems, and in particular to systems and methods for shielding electromagnetic coils for improved inductive power transfer.

BACKGROUND

Portable electronic devices may include one or more batteries that may require recharging from time to time. Such devices may include electric vehicles, cell phones, smart phones, tablet computers, laptop computers, wearable devices, navigation devices, sports devices, health analysis devices, medical data devices, location tracking devices, accessory devices, home appliances, peripheral input devices, remote control devices, and so on.

Some batteries may recharge wirelessly by accepting inductive power provided by an inductive power transmitter. For instance, a battery-powered electronic device configured to accept inductive power may be placed nearby a transmitter adapted to produce inductive power. In these systems, a transmitting coil within the transmitter may produce a time-varying magnetic flux that may induce a current within a receiving coil within the electronic device. The received current may be used by the electronic device to replenish the charge of a rechargeable battery.

In many examples, the inductive power transmitter may transmit more power than is received by the inductive power receiver. In other words, a portion of the magnetic flux produced by transmitter may not pass through the receiving coil, but instead may pass through and disturb other components within the transmitter and/or receiver. This wasted power is often dissipated as undesirable heat.

Accordingly, there may be a present need for an improved method of directing flux from a transmit coil to a receive coil within an inductive power transfer system.

SUMMARY

Embodiments described herein may relate to, include, or take the form of a shield for an annular coil including at least an outer portion contoured to an outer sidewall of the annular coil, an inner portion contoured to an inner sidewall of the annular coil, and a top portion contoured to a top portion of the annular coil, wherein the top portion couples the inner portion to the outer portion.

Other embodiments may include a configuration in which the shield may be made from soft magnetic material. For example, the shield may be iron, iron silicate, iron-cobalt, manganese-zinc, nickel, or nickel-zinc. In further examples, the material selected for the shield may have a relatively high magnetic permeability. In other examples, the shield may be made from a doped material selected such as plastic, glass, or any other composite material. The dopant used may be a metal powder.

Certain embodiments may include a configuration in which the outer portion and inner portion of the shield are defined by a plurality of individual petals that are folded from the top portion of the shield. In these configurations, a filler material can be disposed between individual petals.

Further embodiments may also include an adhesive layer disposed between the shield and the annular coil. The adhesive layer may be a heat activated film and, in some examples, may also be doped with metal powder.

Other embodiments described herein may relate to, include, or take the form of an inductive charging system including an electronic device having a rechargeable battery, a receive coil electrically associated with the battery, and a first shield contoured over at least two surfaces of the receive coil defining a receiving area of the receive coil for concentrating magnetic flux therethrough. Many examples also include an inductive charging device including a housing with an interface surface for receiving the electronic device, a transmit coil within the housing and positioned below the interface surface, and a second shield contoured over at least two surfaces of the transmit coil defining a transmitting area of the receive coil for concentrating magnetic flux therefrom, wherein the transmitting area may be oriented to face the interface surface. In many examples, when the electronic device is positioned on the interface surface, the receiving area may be oriented to face the transmitting area.

Embodiments described herein may relate to, include, or take the form of a method of manufacturing a contoured shield for an electromagnetic coil including at least the operations of forming a shield sheet with a plurality of petals, placing the shield sheet on a first surface of the electromagnetic coil, and folding each of the plurality of petals to contour to the surface of the electromagnetic coil.

Methods described herein may further include positioning a heat activated film between the shield and the electromagnetic coil to form a shielded coil assembly, and subsequently heating the shielded coil assembly to activate the heat activated film.

Other embodiments may further include disposing a filler material between adjacent petals.

Other embodiments may include press fitting the contoured shield and electromagnetic coil assembly onto a mold having a selected shape, for example, a conical shape.

BRIEF DESCRIPTION OF THE FIGURES

Reference will now be made to representative embodiments illustrated in the accompanying figures. It should be understood that the following descriptions are not intended to limit the disclosure to one preferred embodiment. To the contrary, it is intended to cover alternatives, modifications, and equivalents as may be included within the spirit and scope of the described embodiments as defined by the appended claims.

The use of the same or similar reference numerals in different drawings indicates similar, related, or identical items.

DETAILED DESCRIPTION

Embodiments described herein may relate to, include, or take the form of improved methods of and systems for directing flux from a transmit coil to a receive coil within an inductive power transfer system.

An inductive power transfer system typically includes an inductive power-transmitting component to transmit power and an inductive power-receiving component to receive power. An inductive power-receiving component may be incorporated within a portable electronic device to provide a convenient means of wirelessly recharging one or more internal batteries. An inductive power-transmitting component may be incorporated within a recharging device associated with the portable electronic device. Example portable electronic devices may include media players, media storage devices, personal digital assistants, tablet computers, cellular telephones, laptop computers, smart phones, styluses, global positioning sensor units, remote control devices, wearable devices, electric vehicles, home appliances, location tracking devices, medical data devices, health analysis devices, health monitoring devices, sports devices, accessory devices, and so on. Example recharging devices may include docks, stands, clips, plugs, mats, attachments, and so on.

In many examples, a battery-powered electronic device ("accessory") may be positioned on a power-transmitting device or surface ("dock"). In these systems, an electromagnetic coil within the dock ("transmit coil") may produce a time-varying electromagnetic flux ("transmitting power") to induce a current within an electromagnetic coil within accessory ("receive coil"). In other examples, a transmit coil may produce a static electromagnetic field and may physically move, shift, or otherwise change its position to produce a spatially-varying electromagnetic flux to induce a current within the receive coil.

The accessory may use the received current to replenish the charge of a rechargeable battery ("receiving power") or to provide power to operating components associated with the accessory. In other words, when the accessory is positioned on the dock, the dock may wirelessly transmit power via the transmit coil to the receive coil of the accessory.

However, in many examples, the dock often transmits more power than is received by the accessory to ensure the accessory receives the required and expected amount of power. In other words, a portion of the magnetic flux produced by transmit coil does not pass through, and thus does not induce current within, the receive coil of the accessory. For example, the transmit and receive coils are typically positioned along a shared central axis and are oriented in parallel planes to face one another. In this arrangement, a portion of the flux produced the transmit coil may pass behind or beside the transmit coil, into the housing of the dock, or into other portions of the receiver. This unused flux may pass through and disturb other electronic components within the transmitter and/or receiver and may be dissipated as undesirable heat.

In many cases, heating of the accessory and/or dock may cause damage to electronic components or housings, reduce the operative life of either or both devices, may render the devices unsafe to use for a period of time, or may prove inconvenient or frustrating to a user compelled to wait for the devices to cool.

Accordingly, embodiments described herein relate to, include, and take the form of improved methods of directing flux from a transmit coil to a receive coil by providing a contoured flux-directing shield on either or both the transmit and receive coils within an inductive power transmitting system.

Typical portable electronic devices including one or more electromagnetic coils for inductive power transfer may include a planar shield, such as a ferrite sheet, to protect electronic components from flux generated by a transmit or receive coil. For example, an inductive power transmitter may include a ferrite sheet layer between a transmit coil and operational circuitry to protect the circuitry from disturbance, interference, or heating resulting from the passage of flux therethrough. In other examples, an accessory may include a ferrite sheet layer between a receive coil and operational circuitry to similarly protect (i.e., direct flux away from) the operational circuitry.

Embodiments described herein relate to flux-directing shields for electromagnetic coils that are contoured to the coil to provide concentrated flux paths directed toward an axially aligned receive coil. For example, as noted above, transmit and receive coils may be positioned along a shared central axis and are oriented in parallel planes to face one another. Embodiments described herein contour a contoured shield around the surfaces of the coils not facing one another such that a concentrated flux path is defined between the front-facing surfaces of the transmit and receive coils.

In one embodiment with an annular transmit coil having a rectangular cross-section, the contoured shield may have three defined surfaces. A first surface of the shield may contour to the interior sidewall of the annular transmit coil. A second surface of the shield may contour to the exterior sidewall of the annular transmit coil. A third surface of the shield may contour to the back surface of the annular transmit coil. In this manner, three of four sides of the rectangular cross-section of the annular transit coil may be shielded by the contoured shield. As a result of the contoured shield, magnetic flux emanating from the interior sidewall, exterior sidewall, and back surface of the annular transmit coil may be absorbed by the contoured shield and redirected to exit the shield along the front surface of the transmit coil.

In many embodiments, the contoured shield may be made from a ferromagnetic material such as iron or an iron alloy such as iron cobalt, iron nickel, or steel. In further embodiments, other materials may be used such as materials having a relatively high magnetic permeability. In still further embodiments, the material selected for the contoured shield may be a doped polymer. For example, the polymer may be doped with an iron powder or an iron alloy powder. These and other materials may be selected for the contoured shield to provide a path of lower magnetic reluctance for the flux produced by the coil. Accordingly, flux is directed to emanate from the front face of the coil.

Further embodiments may include a contoured shield that is formed to interstitially engage the area between individual coils. For example, a transmit coil may include more than one stacks of windings of wire having a circular cross-section. In these embodiments, the contoured shield may be formed interstitially within the void space defined between the stacked coils. In this manner, the contoured shield may more tightly engage the coil, providing a path of even lower magnetic reluctance for the flux produced by the coil. Accordingly, flux is directed to emanate from the front face of the coil.

The thickness of the contoured shield may vary from embodiment to embodiment. In many examples, the thickness may be selected, at least in part, upon the magnetic saturation point and permeability of the material in addition to the strength of the magnetic field to be produced by the coil. For example, in certain embodiments, high magnetic permeability may be desirable. One may appreciate that materials with high magnetic permeability typically have low magnetic saturation points. In these embodiments, the thickness of the contoured shield may depend on the maximum magnetic field expected from the coil. In further embodiments, the contoured shield may be composed of a composite material, such as a layered material. Individual layers may be adapted to have different magnetic permeability, different thickness, or may be made from different materials.

In further embodiments, the contoured shield may be affixed or adhered to the coil using one or more layers of adhesive. For example, certain embodiments may include a heat activated film adhesive disposed between the contoured shield and the coil. During a production process, the contoured shield, film, and coil may be heated to permanently adhere the contoured shield to the coil. In other embodiments, the adhesive may be a curable liquid adhesive or any other type of adhesive.

In further embodiments, the adhesive may be made from a polymer material that may be doped with a dopant having high magnetic permeability. For example, a heat activated film may be doped with iron powder, an iron alloy powder, or any other high permeability dopant. In this manner, the adhesive itself may provide a path of low magnetic reluctance for the flux produced by the coil.

In many embodiments, a contoured shield may also be applied to multiple surfaces of a receive coil. In this manner, the contoured shield may provide a low path of magnetic reluctance for the flux produced by the transmit coil such that a greater density of flux passes through the receive coil.

In many embodiments, the receive coil may be incorporated within a portable electronic device and the transmit coil may be incorporated within a recharging device. In these embodiments, the shielded transmit and receive coils may be positioned within their respective housings with the open front face positioned outwardly. In this manner, when the portable electronic device and a recharging device are positioned nearby one another, the contoured shields may direct flux produced by the transmit coil in the direction of the receive coil.

Figure 1A:
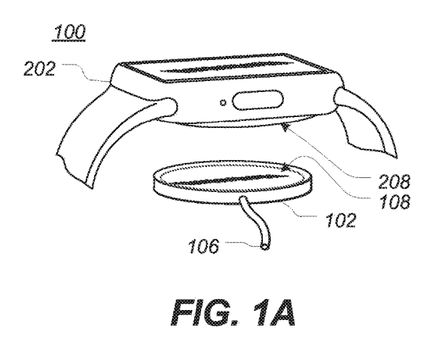
FIG. 1A depicts a front perspective view of an example inductive power transfer system in an unmated configuration.

FIG. 1A depicts a front perspective view of an example inductive power transfer system in an unmated configuration. The illustrated embodiment shows an inductive power transmitter dock that is configured to couple to and wirelessly pass power to an inductive power receiver accessory such as a portable electronic device or wearable accessory.

The wearable accessory, such as depicted in FIG. 1A, may be configured to provide health-related information or data such as but not limited heart rate data, blood pressure data, temperature data, oxygen level data, diet/nutrition information, medical reminders, health-related tips or information, or other health-related data. The wearable accessory may optionally convey the health-related information to a separate electronic device such as a tablet computing device, phone, personal digital assistant, computer, and so on.

A wearable accessory may include a coupling mechanism to connect a strap or band useful for securing to a user. For example, a smart watch may include a band or strap to secure to a user's wrist. In another example, a wearable health assistant may include a strap to connect around a user's chest, or alternately, a wearable health assistant may be adapted for use with a lanyard or necklace. In still further examples, a wearable device may secure to or within another part of a user's body. In these and other embodiments, the strap, band, lanyard, or other securing mechanism may include one or more electronic components or sensors in wireless or wired communication with the accessory. For example, the band secured to a smart watch may include one or more sensors, an auxiliary battery, a camera, or any other suitable electronic component.

In many examples, a wearable device, such as depicted in FIG. 1A, may include a processor coupled with or in communication with a memory, one or more communication interfaces, output devices such as displays and speakers, and one or more input devices such as buttons, dials, microphones, or touch-based interfaces. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable device may provide information regarding time, health, statuses or externally connected or communicating devices and/or software executing on such devices, messages, video, operating commands, and so forth (and may receive any of the foregoing from an external device), in addition to communications.

Although the system 100 illustrated in FIG. 1A depicts a wristwatch, any electronic device may be suitable to receive inductive power from an inductive power transmitting dock. For example, a suitable electronic device may be any portable or semi-portable electronic device that may receive inductive power, and a suitable dock device may be any portable or semi-portable docking station that may wirelessly transmit inductive power.

Accordingly, the system 100 may include an inductive power transmitter 102 and an inductive power receiver 202. The inductive power transmitter 102 and the inductive power receiver 202 may each respectively include a housing to enclose electronic components therein. In many examples, and as depicted, the inductive power receiver 202 may be larger than the inductive power transmitter 102, although such a configuration is not required.

In the illustrated embodiment, the inductive power transmitter 102 may be connected to power, such as an alternating current power outlet, by power cord 106. In other embodiments, the inductive power transmitter 102 may be battery operated. In still further examples, the inductive power transmitter 102 may include a power cord 106 and an internal or external battery. Similarly, although the embodiment is depicted is shown with the power cord 106 coupled to the housing of the inductive power transmitter 102, the power cord 106 may be connected by any suitable means. For example, the power cord 106 may be removable and may include a connector that is sized to fit within an aperture or receptacle opened within the housing of the inductive power transmitter 102.

Figure 1B:
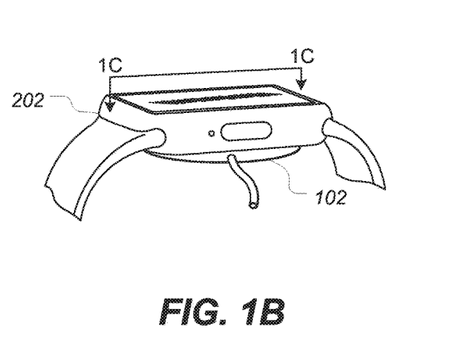
FIG. 1B depicts a front perspective view of an example inductive power transfer system in a mated configuration.

As shown, the inductive power receiver 202 may include a lower surface 208 that may interface with, align or otherwise contact an interface surface 108 of the inductive power transmitter 102. In this manner, the inductive power receiver 202 and the inductive power transmitter 102 may be positionable with respect to each other. In certain embodiments, the interface surface 108 may be configured in a particular shape that mates with a complementary shape of the inductive power receiver 202, for example as shown in FIG. 1B. The interface surface 108 may include a concave shape that follows a selected curve. The bottom surface 208 of the inductive power receiver 202 may take a convex shape following the same or substantially similar curve as the interface surface 108. In other examples, the interface surface 108 may be substantially flat.

Additionally or alternatively, the inductive power transmitter and receiver devices 102, 202 can be positioned with respect to each other using one or more alignment mechanisms. As one example, one or more magnetic devices may be included in the transmitter and/or receiver devices 102, 202 and may be used to align the transmitter and receiver devices with respect to one another. In another example, one or more actuators in the transmitter and/or receiver devices 102 can be used to align the transmitter and receiver devices. And in yet another example, alignment features, such as protrusions and corresponding indentations in the housings of the transmitter and receiver devices, may be used to align the transmitter and receiver devices. The design or configuration of the interface surfaces, one or more alignment mechanisms, and one or more alignment features can be used individually or in various combinations thereof.

Figure 1C:
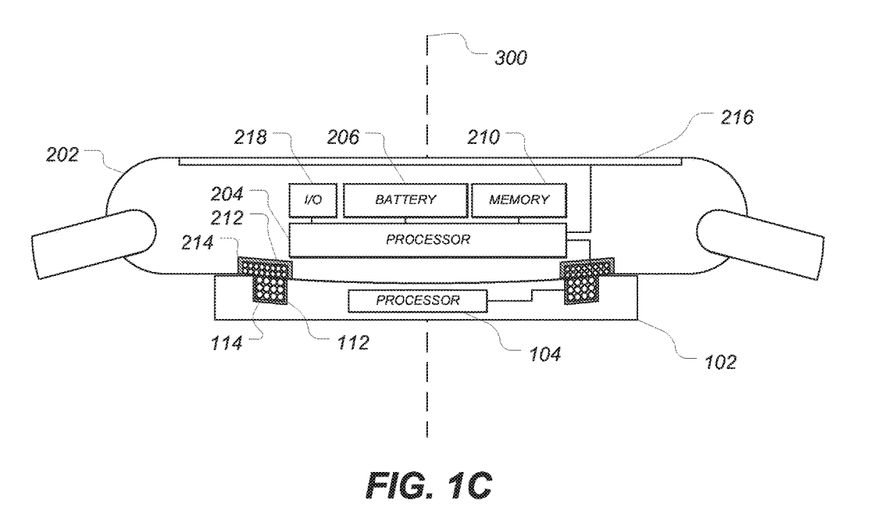
FIG. 1C depicts a side cross section view of the inductive power transfer system of FIG. 1B along line 1C-1C.

FIG. 1C depicts a side cross-section view taken along line 1C-1C of FIG. 1B, showing the example inductive power transfer system in an aligned configuration, including an example system diagram of the inductive power receiver 202 and the inductive power transmitter 102. As illustrated, the bottom surface 208 of the inductive power receiver 202 contacts the interface surface of the inductive power transmitter 102.

As described partially with respect to FIG. 1A, the inductive power receiver 202 may include one or more electronic components within its housing such as a processor 204 and a receive coil 212. The receive coil 212 may have one or more windings and may receive power from the inductive power transmitter 102. Thereafter, the receive coil 212 may pass the received power to the processor 204. The processor 204 may use the received power to perform or coordinate one or more functions of the inductive power receiver 202 and/or to replenish the charge of a battery 206.

The inductive power receiver 202 may also include other electronic components coupled to the processor 204. For example, the inductive power receiver 202 can include memory 210, a display 216, one or more input/output devices 218 such as buttons, force interfaces, touch interfaces, microphones, and/or speaker(s), communication interfaces for wired and/or wireless communication, and so on.

The inductive power receiver 202 may also include one or more sensors used by the processor 204 to collect environmental information, user information, or any other type of information. Environmental sensors may include weather sensors such as barometric pressure sensors, humidity sensors, particle counters, temperature sensors, moisture sensors, ultraviolet sensors, infrared sensors, airflow and wind sensors, precipitation sensors, accumulation sensors, and so on. User information sensors may include health-related sensors such as skin conductance sensors, temperature sensors, pulse oximetry sensors, blood pressure sensors, and so on.

The inductive power transmitter 102 may also include a transmit coil 112 having one or more windings. The transmit coil 112 may transmit power to the inductive power receiver 202. The transmit coil 112 may be coupled to a processor 104 that may at least partially control the transmit coil 112. For example, in certain embodiments, the processor 104 may drive the transit coil 112 with a power signal in order to induce a particular voltage within the receive coil 212. Both the transmit coil 112 and the receive coil 212 may be shielded by a contoured shield 114, and 214 respectively.

The processor 104 may control or periodically adjust one or more aspects of the power signal applied to the transmit coil 112. For example, the processor 104 may change the operating frequency of the power signal. In some examples, the operating frequency of the power signal may be increased in order to increase the power received by the receive coil 212. In addition, the processor 104 may be used to perform or coordinate other functions of the inductive power transmitter 102.

As noted above, power transfer efficiency between the inductive power transmitter 102 and the inductive power receiver 202 may be optimized when the receive coil 212 is aligned with the transmit coil 112 along a mutual axis. In many examples, a slight misalignment of the inductive power transmitter 102, for example resulting from manufacturing variances, and the inductive power receiver 202 may result in a substantial misalignment of the transmit coil 112 and receive coil 212. In many examples, misalignment may, in turn, substantially reduce power transfer efficiency. Preferably, the inductive power transmitter 102 and the inductive power receiver 202 are aligned along a mutual axis 300, as shown in FIG. 1C.

Figure 2A:
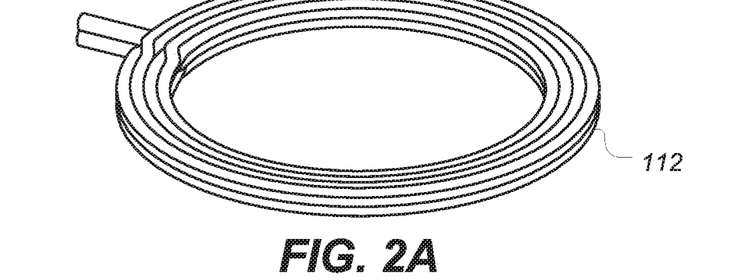
FIG. 2A depicts a top perspective view of an example unshielded electromagnetic coil.

FIG. 2A depicts a top perspective view of an example unshielded transmit coil 112 that may be included in the embodiments depicted in FIGS. 1A-1C. As illustrated, the coil 112 includes several windings of an electrical conductor such as copper. In other embodiments, an individual winding may be composed of several independent strands of wire. In many examples, the windings may be provided in a substantially annular shape, with one or more layers of windings. As depicted, three layers of four windings provides an electromagnetic coil with twelve total turns. In many embodiments, the leads of the coil 112 may exit the coil on the same side. In the illustrated embodiment, the coil 112 has a rectangular cross section, although such a configuration is not required.

Figure 2B:
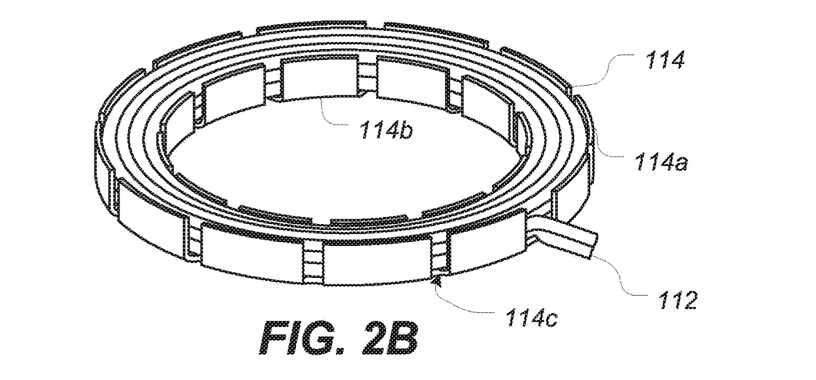
FIG. 2B depicts a bottom perspective view of the example electromagnetic coil of FIG. 2A shielded on three sides.
Figure 2C:
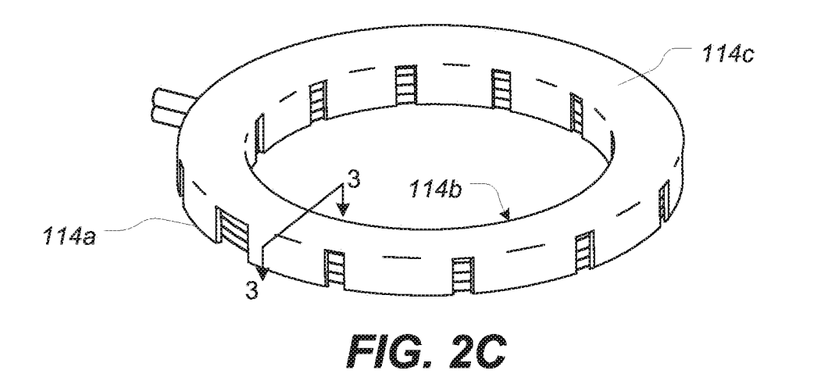
FIG. 2C depicts a top perspective view of an example electromagnetic coil of FIG. 2A.

FIG. 2B and FIG. 2C depict a bottom perspective view and a top perspective view, respectively, of the example electromagnetic coil of FIG. 2A having a contoured shield 114 covering three sides of the coil. As depicted, the contoured shield 114 may have three defined surfaces. A first surface of the contoured shield 114 may contour to the exterior sidewall of the coil 112, depicted as the exterior perimeter of the coil 112. The first surface may be defined by a plurality of folded petals 114a. The petals 114a may be evenly spaced around the external perimeter of the coil 112.

A second surface of the contoured shield 114 may contour to the interior sidewall of the coil 112. The second surface may be defined by a plurality of folded petals 114b. As with the petals 114a, the petals 114b may be evenly spaced around the internal sidewall of the coil 112.

A third surface of the contoured shield 114 may contour to the back surface of the coil 112. The third surface may define a ring 114c. In many examples, and as depicted, the petals 114a, 114b may extend from the ring 114c, bending at an angle to contour to the respective sidewalls of the layers of windings defining the coil 112. In this manner, the contoured shield 114 may be formed of a singular, unitary material. Notwithstanding, a unitary piece may not be required or suitable for each embodiment described herein. For example, the petals 114a, 114b may be attached or otherwise affixed to the ring 114c by any suitable means. For example, in certain embodiments, the petals 114a, 114b may be welded, glued, or otherwise attached to the ring 114c in a separate manufacturing process.

In this manner, three of four sides of the rectangular cross-section of the coil 112 may be shielded by the shield 114. As noted above, as a result of the contoured shield 114, magnetic flux emanating from the interior sidewall, exterior sidewall, and back surface of the annular transmit coil may be absorbed by the contoured shield and redirected to exit the shield along the front surface of the transmit coil. In other words, flux may be directed up in relation to the orientation depicted in FIG. 2B, emanating from the unshielded and exposed upper surface of the coil 112. Similarly, flux may be directed down in relation to the orientation depicted in FIG. 2C.

Although shown as separated, the petals 114a, 114b may be joined, welded, or otherwise bonded to adjacent petals 114a, 114b by any suitable means. In still further embodiments, the areas between adjacent petals may be filled with a filler material. The filler material may be a material having a high magnetic permeability. For example, the filler material may be an adhesive including a ferromagnetic dopant.

Although the petals 114a and 114b are illustrated as substantially rectangular, such a configuration is not required and other shapes are suitable to include with the various embodiments described herein and embodiments related thereto.

In still further embodiments, the contoured shield 114 may be formed from three separate components (i.e., outer ring, inner ring, washer) that are welded, glued, or otherwise adhered together.

Figure 3A:
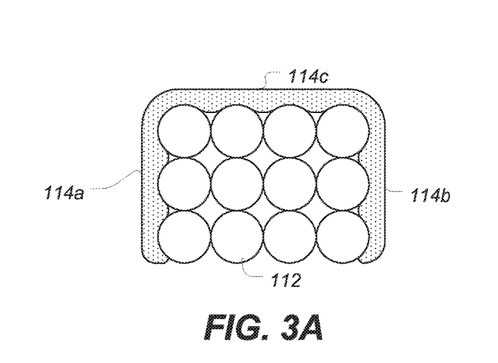
FIG. 3A depicts an example side cross-section view taken along line 3-3 of FIG. 2C showing a contoured shield at least partially interstitially engaging an outer surface of the electromagnetic coil.

FIG. 3A depicts an example side cross-section view taken along line 3-3 of FIG. 2C showing the contoured shield 114 of FIG. 2C at least partially interstitially engaging an outer surface of the coil 112. For example, a coil 112 may include more than one stacks of windings of wire having a circular cross-section as shown. In these embodiments, the contoured shield 114 may be formed interstitially within the void space defined between the stacked coils. In this manner, the contoured shield 114 may more tightly engage the coil 112 along the ring 114c and petals 114a,114b thus providing a path of low magnetic reluctance for the flux produced by the coil. Accordingly, flux is directed to emanate from the front face of the coil 112. In other words, flux may be directed down in relation to the orientation depicted in FIG. 3A.

Figure 3B:
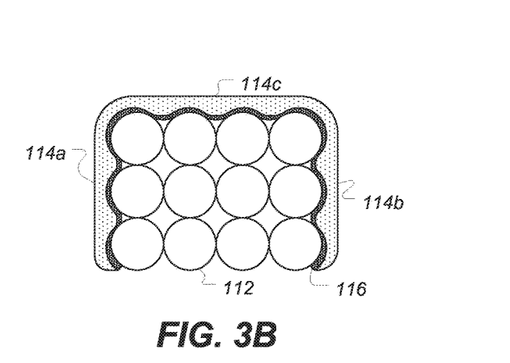
FIG. 3B depicts an example side cross-section view taken along line 3-3 of FIG. 2C showing a contoured shield at least partially interstitially engaging an outer surface of the electromagnetic coil via a heat activated film.

FIG. 3B depicts an example side cross-section view taken along line 3-3 of FIG. 2C showing a contoured shield 114 at least partially interstitially engaging an outer surface of the coil 112 via a heat activated film 116. As depicted, the contoured shield 114 may be affixed or adhered to the coil 112 using one or more layers of adhesive, such as the heat activated film 116. The heat activated film 116 adhesive may be disposed between the contoured shield 114 and the coil 112. During a production process, the contoured shield 114, the heat activated film 116, and the coil 112 may be heated to permanently adhere the contoured shield 114 to the coil 112. In other embodiments, the adhesive may be a curable liquid adhesive or any other type of adhesive.

In further embodiments, the heat activated film 116 may be made from a polymer material that may be doped with a dopant having high magnetic permeability. For example, the heat activated film 116 may be doped with iron powder, an iron alloy powder, or any other high permeability dopant. In this manner, the heat activated film 116 itself may provide a path of low magnetic reluctance for the flux produced by the coil.

Figure 3C:
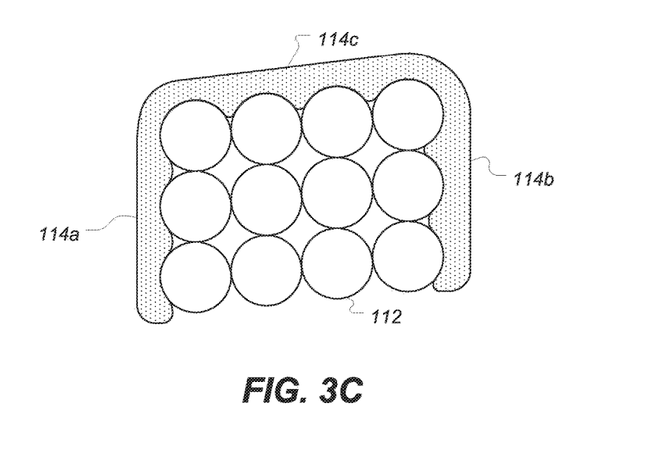
FIG. 3C depicts an example side cross-section of a shielded coil showing a contoured shield at least partially interstitially engaging an outer surface of the coil, the shield and the coil following an arbitrary curve.

In other embodiments, the contoured shield 114 and the coil 112 may be press fit in a manufacturing process to profile an arbitrary shape. For example, as depicted in FIG. 3C, the coil 112 and the contoured shield 114 following an upward slope. One may appreciate that a sloping cross-section such as illustrated may represent a cross section of a portion of a conical annular coil. Although illustrated as following a rising slope and, by extension, forming a conical coil, the coil 112 and contoured shield 114 may be formed to follow any arbitrary shape. In many examples, the coil 112 and contoured shield 114 may be formed to follow a curvature of a housing of a device, such as the inductive power receiver 202 as shown in FIGS. 1A-1C. For example, the coil 112 and contoured shield 114 may be formed to follow the curvature of the bottom surface 208 as shown in FIG. 1A.

Figure 4A:
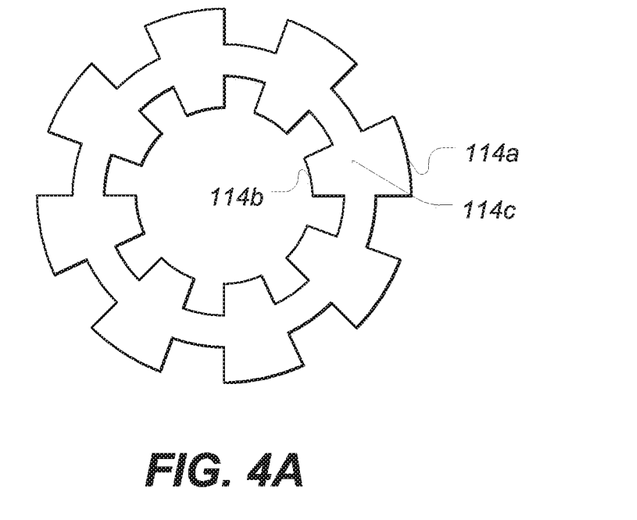
FIG. 4A depicts an example top plan view of a die cut shield prior to forming onto an electromagnetic coil.

FIG. 4A depicts an example top plan view of a die cut shield prior to forming onto an electromagnetic coil. In certain embodiments, the contoured shield 114 may be initially formed in a die cutting process. The die cutting process may define the pre-contoured shape of the contoured shield 114, for example by defining the dimensions of each of the petals 114a and 114b.

Figure 4B:
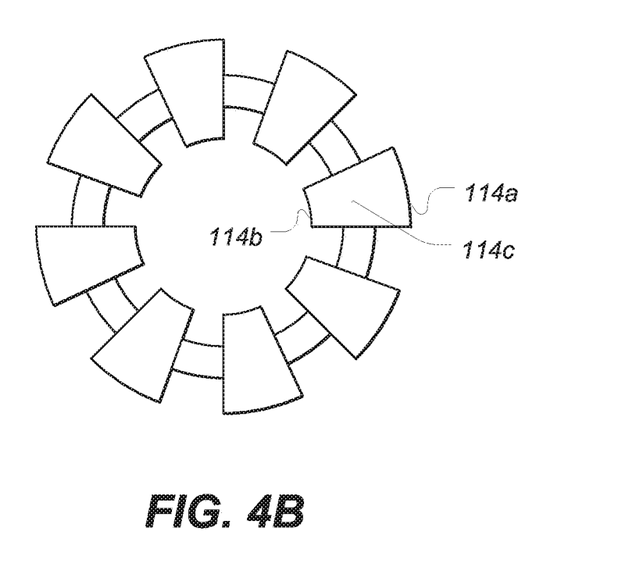
FIG. 4B depicts an example top plan view of a die cut and separated shield prior to forming onto an electromagnetic coil.

FIG. 4B depicts an example top plan view of a die cut and separated shield prior to forming onto an electromagnetic coil. In these embodiments, a contoured shield 114 may be electrically separated into individual components in order to prevent or discourage the excitation of eddy currents within the shield material. In the illustrated embodiment, cuts may be made in the ring 114c that separate the ring 114c and all petals 114a and petals 114b.

Figure 5:
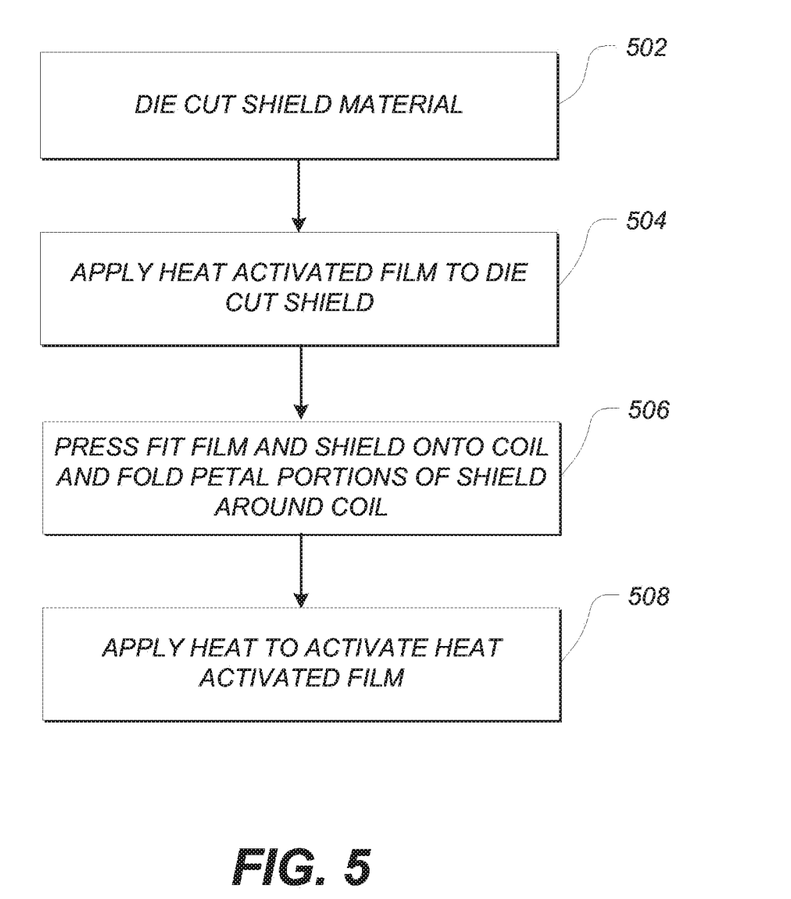
FIG. 5 depicts a flow chart of example operations of a method for applying a contoured shield to an electromagnetic coil.

FIG. 5 depicts a flow chart of example operations of a method for applying a contoured shield to an electromagnetic coil. The method may begin at 502 in which a sheet of material may be die cut to form a shield. At 504, a heat activated film may be applied to the die cut shield portion. In some embodiments the heat activated film may be applied before the die cutting process of 502. Next at 506, the heat activated film and die cut shield may be press fit onto the coil. In the same, or subsequent operation, each of the petal portions may be folded around the coil. Next at 508, heat may be applied to the assembly to activate the heat activated film. In some embodiments, the heat may also partially melt or soften the material selected for the die cut shield such that the shield flows to occupy void space between individual turns of the coil. In this manner, the shield may become interstitially integrated with the coil.

Figure 6:
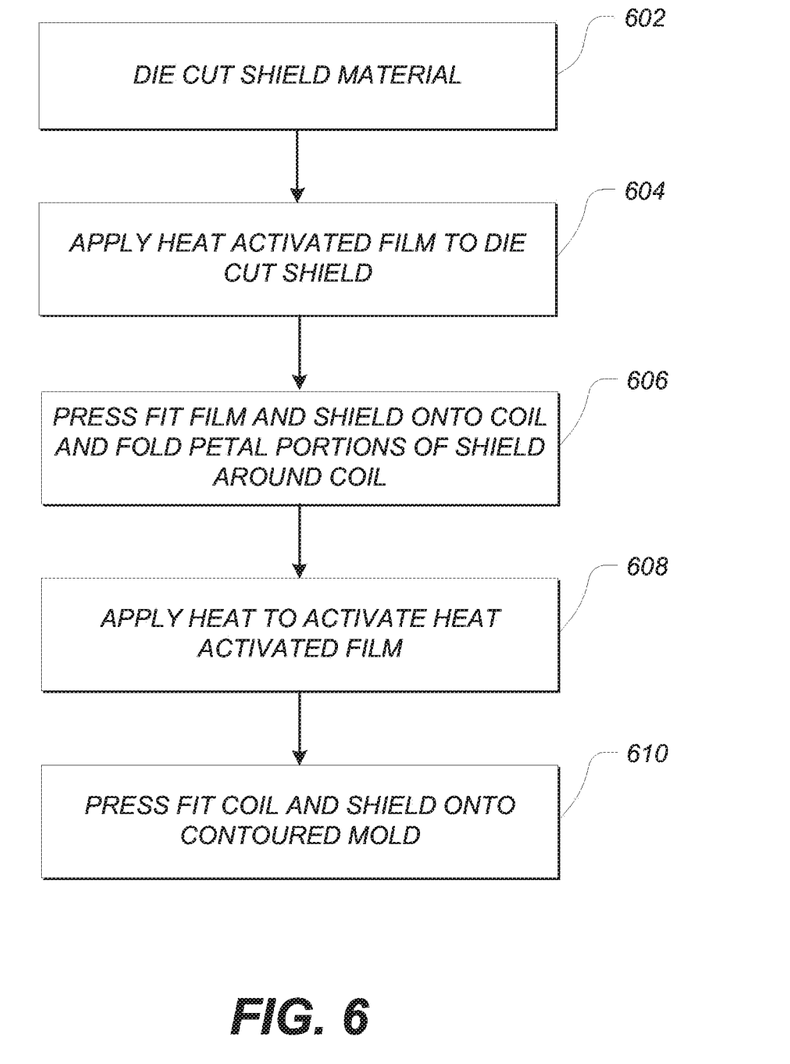
FIG. 6 depicts a flow chart of example operations of a method for applying a contoured shield to an electromagnetic coil.

FIG. 6 depicts a flow chart of example operations of a method for applying a contoured shield to an electromagnetic coil. The method may include operations similar to the method depicted in FIG. 5. For example, the method may begin at 602 in which a sheet of material may be die cut to form a shield. At 604, a heat activated film may be applied to the die cut shield portion. At 606, the heat activated film and die cut shield may be press fit onto the coil. Thereafter, at 608, heat may be applied to the assembly to activate the heat activated film. Lastly, at 610, the coil and shield may be press fit onto a contoured mold that may form the coil and shield into an arbitrary shape as described above with reference, for example, to FIG. 3C.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A shield for an annular coil, the shield comprising:
a first portion; and
a second portion coupled to the first portion, wherein the first portion and the second portion are contoured over at least two surfaces of the annular coil such that the first portion and the second portion fill within at least a portion of void spaces defined between stacked coils positioned along the at least two surfaces of the annular coil.

2. The shield of claim 1 wherein the shield is made from soft magnetic material.

3. The shield of claim 2 wherein the shield is made from at least one of iron, iron silicates, iron-cobalt, manganese-zinc, nickel, or nickel-zinc.

4. The shield of claim 1 wherein the shield is made from a doped material selected from plastic, glass, or composite material.

5. The shield of claim 4 wherein the doped material comprises a dopant made from a metal powder.

6. The shield of claim 1 further comprising a third portion coupled to the first portion and the second portion.

7. The shield of claim 1 further comprising an adhesive layer disposed between the shield and the annular coil.

8. The shield of claim 7 wherein the adhesive layer comprises a heat activated film.

9. The shield of claim 7 wherein the adhesive layer is made from a doped material comprising a dopant made from a metal powder.

10. The shield of claim 1 wherein:
the annular coil comprises a plurality of windings of an electrical conductor defining an interior coil sidewall, an exterior coil sidewall and a back surface extending between the interior sidewall and the exterior sidewall;
the first portion is contoured to either the interior sidewall and the exterior sidewall; and
the second portion comprises a ring contoured to the back surface.

11. The shield of claim 1 wherein the annular coil is contained within a first housing.

12. A shield for an annular coil, the shield comprising:
a first portion comprising a plurality of individual petals; and
a second portion comprising a ring and coupled to the first portion, wherein the first portion and the second portion are contoured over at least two surfaces of the annular coil such that the first portion and the second portion fill within at least a portion of void spaces defined between stacked coils positioned along the at least two surfaces of the annular coil.

13. The shield of claim 12 further comprising a filler material disposed between adjacent individual petals of the plurality of individual petals.

14. The shield of claim 12, further comprising a third portion coupled to the first portion and the second portion, wherein the second portion is disposed between the first portion and the third portion.

15. The shield of claim 14 wherein the third portion comprises a plurality of individual petals positioned across the second portion from the plurality of individual petals of the first portion.

16. The shield of claim 14 further comprising a filler material disposed between adjacent individual petals of the plurality of individual petals.

17. An inductive charging system comprising:
an electronic device comprising:
an annular receive coil; and
a shield contoured over at least two surfaces of the receive coil such that the shield fills within at least a portion of void spaces defined between stacked coils positioned along the at least two surfaces of the receive coil.

18. The inductive charging system of claim 17 wherein the shield defines a receiving area of the receive coil for concentrating magnetic flux therethrough.

19. The inductive charging system of claim 18 wherein the shield is a first shield, and the inductive charging system further comprises:
an inductive charging device comprising:
a housing comprising an interface surface for receiving the electronic device;
a transmitter coil within the housing and positioned below the interface surface; and
a second shield contoured over at least two surfaces of the transmitter coil defining a transmitter area of the receive coil for concentrating magnetic flux therefrom;
wherein:
the transmitter area is oriented to face the interface surface.

20. The inductive charging system of claim 19 wherein the electronic device is received on the interface surface, the receiving area is oriented to face the transmitting area.

* * * * *